Figure 1:
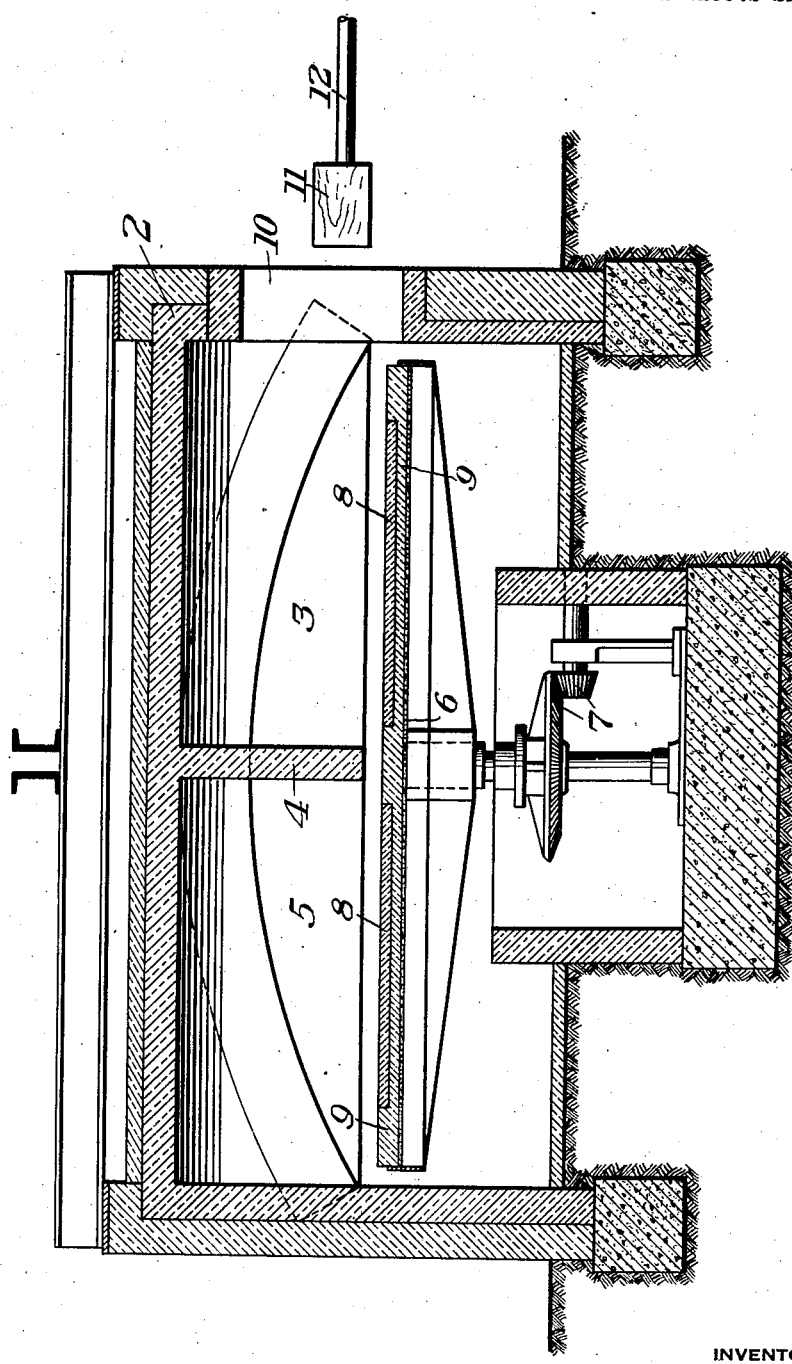

Patented Sept. 6, 1927.

1,641,918

UNITED STATES PATENT OFFICE.

ELBRIDGE J. CASSELMAN, OF PITTSBURGH, AND NICK GRIFFITH AND CHARLES E. JOHNSON, OF JEANNETTE, PENNSYLVANIA, ASSIGNORS TO WINDOW GLASS MACHINE COMPANY, OF PITTSBURGH, PENNSYLVANIA, A CORPORATION OF NEW JERSEY.

APPARATUS FOR FLATTENING SHEET GLASS.

Application filed August 16, 1926. Serial No. 129,342.

This invention relates to the flattening of sheet glass, and is applicable not only to the flattening operation performed on cylinders or shawls produced by the cylinder process of making window glass, but also to other processes such as the well known Colburn process for the drawing of a flat sheet of glass from a bath.

It has heretofore been common practice in the flattening of glass cylinders or shawls to support the cylinder or shawl on the flattening stone and subject it to sufficient heat to cause it to lay flat thereon. The glass is usually rubbed with a wooden block to remove any wrinkles therefrom. In the Colburn process of making sheet glass the glass is drawn in a continuous sheet and is passed over a bending roll, after which it is supported on a so-called "flattening table" which is constructed along the same general lines as a chain grate stoker. The glass is generally gripped at the edges and stretched while it is thus supported.

If a flattening stone is employed the glass is sometimes injured by "burning". This condition arises when the stone becomes too hot, and as a result small particles on the surface of the stone mark the glass and leave it with the appearance of having been sprinkled with pepper. When glass is supported on the flattening table in the sheet process, it is very frequently marked by such flattening table.

Neither of these defects will appear from a casual glance, but they are very evident to a skilled glass man and they materially reduce the quality of the product.

We provide for flattening glass by laying it on the surface of a glass-like body having a higher melting point than the glass itself and subjecting it to a flattening heat. The glass-like body may consist either of a sheet of glass having a higher melting point than the glass being worked, as, for example, a glass having a higher silica content than the glass being worked. If desired, fused quartz or the like may be used. Fused quartz is a very pure form of silica and is intended to be included when reference is made herein to a material having a high silica content.

In the accompanying drawings—

Figure 2:
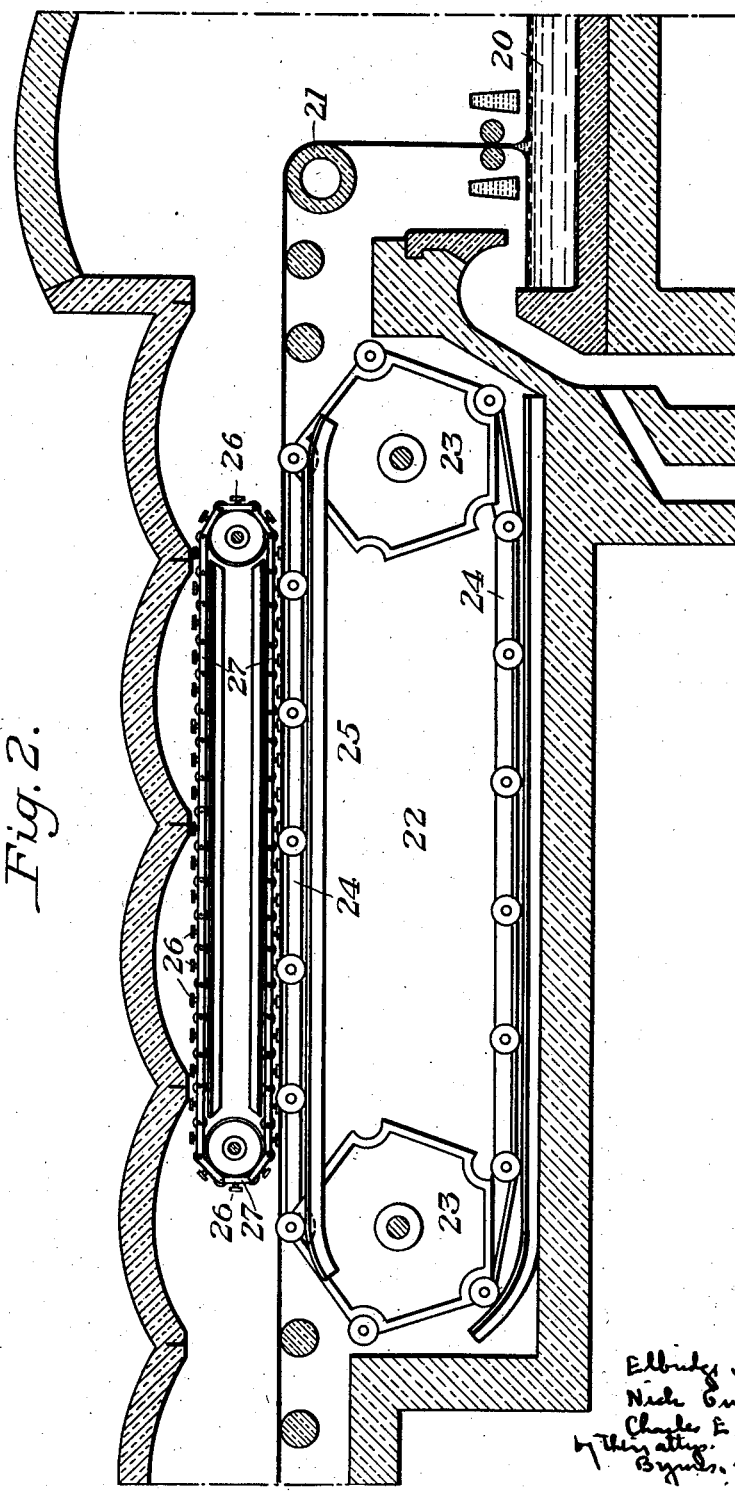

Figure 1 is a vertical section through a flattening oven showing our invention as applied to the flattening of glass cylinders or shawls; and Figure 2 is a longitudinal section through a glass drawing apparatus corresponding generally to the Colburn process.

Referring first to Figure 1, there is shown a flattening oven indicated generally by the reference character 2. The flattening chamber proper is indicated at 3 and a mantle or hanging arch 4 separates it from the so-called "dummy oven" 5.

A flattening wheel 6 is provided in the flattening oven, and this is connected through suitable gearing 7 to a turning device, not shown.

The oven is heated by any desired arrangement of burners. These are not shown in the drawing.

Our improved flattening base is mounted on the wheel 6. In the drawing it is shown as consisting of a flat plate 8 made of a material having the desired characteristics embedded in a suitable base material 9.

The glass is ironed through a working opening 10 by a wooden block 11 mounted on a rod 12.

Flattening ovens of this character are generally divided into three parts by hanging arches such as 4, the several compartments being known as the flattening oven, the dummy oven, and the cooling and piling oven. There will therefore be provided four plates 8 so that at any one time one of them will reside in the flattening oven proper, another in the dummy oven, and the remaining two in the cooling and piling oven.

The plates 8 will preferably be made of a fused high silica substance such as fused quartz or high silica glass.

Figure 2 shows the invention as applied to the Colburn process. The apparatus shown in this drawing corresponds generally to that illustrated and described in the copending application of Henry F. Clark, Serial No. 733,746, filed August 23, 1924. In this embodiment of the invention glass in sheet form is drawn from a bath 20 over a bending roll 21 from which it advances to an annealing chamber, indicated generally by the reference character 22. In this chamber there is provided a pair of sprockets 23 connected by articulated tables or beds 24, each having a glass supporting face made of a glass-like material having a higher melting point than the sheet of glass being worked on. The upper run of the tables or beds is carried on guides 25, and the edges of the glass sheet are held down by presser feet 26 on a chain 27 at either side of the glass sheet.

If desired, the working surfaces may be ground or they may be left with an original fire polish imparted thereto during the process of manufacture.

When glass is flattened according to our invention the objectionable marking is eliminated. The flattening base will not soften sufficiently to cause any trouble, if at all, and therefore it will not be scratched by the use of a piling fork or the like by which the flattened glass is lifted from the wheel onto the leer rods in the cylinder flattening process.

We have spoken herein of "flattening" the glass so as to produce a plane sheet. It will be understood, however, that our invention is also applicable to the manufacture of bent glass and that we use the term "flattening" as a broad term and intend by it to cover the step of causing the glass sheet to conform to the supporting base regardless of whether said base is plane or not.

We have illustrated and described two preferred forms of our invention, but it will be understood that the invention is not limited to such forms, as it may be otherwise embodied and practiced within the scope of the following claims.

We claim:

1. Apparatus for flattening glass, comprising a chamber having therein a supporting body for the glass to be flattened, said body being of a glass-like character and having a higher melting point than the glass.

2. Apparatus for flattening glass, comprising a chamber having therein a supporting body for the glass to be flattened, said body being of a glass-like character and having a higher silica content than the glass being worked on.

3. Apparatus for flattening glass, comprising a chamber having therein a supporting body for the glass to be flattened, said body comprising a fused high silica material having a higher melting point than the glass being worked on.

In testimony whereof we have hereunto set our hands.

ELBRIDGE J. CASSELMAN.
NICK GRIFFITH.
CHARLES E. JOHNSON.